United States Patent [19]

Hartsock

[11] Patent Number: 4,592,268
[45] Date of Patent: Jun. 3, 1986

[54] METHOD OF MAKING AND APPARATUS FOR COMPOSITE PISTONS

[75] Inventor: Dale L. Hartsock, Livonia, Mich.

[73] Assignee: Ford Motor Company, Dearborn, Mich.

[21] Appl. No.: 617,446

[22] PCT Filed: Dec. 27, 1983

[86] PCT No.: PCT/US83/02035

§ 371 Date: Dec. 27, 1983

§ 102(e) Date: Dec. 27, 1983

[87] PCT Pub. No.: WO85/02804

PCT Pub. Date: Jul. 4, 1985

[51] Int. Cl.$^4$ .............................................. F16J 1/04
[52] U.S. Cl. ........................................ 92/212; 92/213; 92/224
[58] Field of Search ................. 92/248, 211, 212, 213, 92/222, 224; 123/193 P

[56] References Cited

U.S. PATENT DOCUMENTS

| | | | |
|---|---|---|---|
| 3,354,793 | 11/1967 | Meier et al. | 92/213 X |
| 4,440,069 | 4/1984 | Holtzberg et al. | 92/244 |
| 4,524,498 | 6/1985 | Hartsock | 92/212 X |
| 4,530,341 | 7/1985 | Palm | 123/193 P X |

FOREIGN PATENT DOCUMENTS 160790 12/1921 United Kingdom ............ 123/193 P

Primary Examiner—Robert E. Garrett
Assistant Examiner—Mark A. Williamson
Attorney, Agent, or Firm—Joseph W. Malleck; Roger L. May

[57] ABSTRACT

A composite piston structure and a method of making same is disclosed. A piston member, carrier member, and ceramic facing member are formed, the piston member being comprised of a material selected from plastic and metal having a density of less than 0.15 lb/in$^3$, the ceramic facing member, preferably comprised of a material selected from zirconia and aluminia, and carrier member preferably comprised of a material selected from stainless steel and cast iron. The carrier member material has a coefficient of thermal expansion differing from the coefficient of thermal expansion of the ceramic by up to $2.0 \times 10^{-6}$ in/in/°F. An annular grooved wall is defined in the side surface of the piston member and disposed at a location radially opposite a portion of the carrier member when the latter is wrapped about the top of the piston member. A high energy beam is directed across a zone of the carrier member that is radially aligned with the grooved wall and deployed to melt a portion of the carrier member intersected by the beam, causing the melted material to flow into the grooved wall to fill same and lock the piston member to the carrier member, upon solidification, for conjoint movement.

12 Claims, 2 Drawing Figures

Beam Direction

METHOD OF MAKING AND APPARATUS FOR COMPOSITE PISTONS

TECHNICAL FIELD

The invention relates to the art of making ceramic/metal composite pistons useful in reciprocating engines.

BACKGROUND OF THE INVENTION AND PRIOR ART STATEMENT

Pistons used heretofore in reciprocating engines are subjected to a variety of destructive forces, including: high thermal stress (particularly about the upper face of the piston), high temperature friction forces which wear the piston zone immediately above the piston rings, and high inertia forces resulting from the density of the piston material. It is now common to use an aluminum based piston to reduce weight inertia, but such aluminum is not high in wear resistance and is weak at high temperatures requiring insulation to protect it in high performance applications.

The state of the art has embedded, by friction, welding, annular wear resistant rings (of steel, bronze, or silicon alloys) in the upper shoulder of aluminum pistons to reduce high temperature frequency friction wear (see U.S. Pat. No. 3,596,571). However, such composite structure fails to reduce or eliminate high temperature thermal stress and is devoid of an insulative member.

The state of the art has coated ceramic to an aluminum piston to improve the insulating quality of the hot top of the piston (see U.S. Pat. No. 4,245,611). However, such coating gives insufficient insulation unless extremely thick, which fact then contributes to cracking and differential thermal expansion problems associated with the supporting aluminum piston. The art has also sintered a graduated powder mixture of silicon carbide and iron to the top face of an iron piston in an effort to insulate the base portion of the piston from the hot zone of the engine (see U.S. Pat. No. 2,657,961). Unfortunately, silicon carbide has a thermal conductivity higher than iron, even in a porous condition, and thus prevents obtaining a significant improvement in temperature insulation of the piston. This art fails to suggest a way of avoiding thermal stress in aluminun pistons.

Ceramic materials are known in the art that have high insulating qualities but are typically fragile and can crack if subjected to forces resulting from differential thermal expansion of adjacent materials. What is needed, to utilize the advantages of aluminum or other low density material and to overcome the thermal stress problem associated with aluminum, is a method of supporting a highly dense and insulative ceramic cap on an aluminum piston in a manner that obviates the difference in coefficient of thermal expansion between aluminum and the ceramic.

SUMMARY OF THE INVENTION

The invention is a method of making and the resulting structure for a composite piston of a reciprocating engine. The method comprises: (a) forming members to constitute the composite piston, including a piston member comprised of a material selected from plastic and metal having a density of less than about 0.15 lb/in$^3$, a ceramic facing member adapted to extend over the top of the piston, and a carrier member effective to separate the facing member from the piston member while securing the facing member and piston member together for conjoint movement, the carrier member having one side adapted to wrap over the top of the piston with a portion depending along at least a portion of the piston side, the carrier member having an opposite side with means to secure the facing member for movement therewith, the carrier member being comprised of a material having a coefficient of thermal expansion differing from the coefficient of thermal expansion of the ceramic by up to about $2.0 \times 10^{-6}$; (b) defining an annular grooved wall in the side surface of the piston member, the grooved wall being disposed at a location radially opposite the depending portion of the carrier member when the latter is in the wrapped position; and (c) with the carrier member wrapped about the piston, directing a high energy beam across a zone of the carrier member radially aligned with the grooved wall and effective to melt the portion of the carrier member intersected by the beam and thereby flow a portion of the melted material into the grooved wall to fill the same and lock the piston to the carrier member upon solidification.

Preferably the piston is formed with a cast-in-place metallic ring forming in the side of the piston, the annular grooved wall being defined in the metallic ring. The metallic ring is comprised of a material having a coefficient of thermal expansion intermediate that of the material for the piston and for the carrier member. Advantageously, the material of the cast-in-place metallic ring is comprised of nickel resist iron, permitting the ring to serve as a wear resistant shoulder element.

The carrier member material may be selected from the group consisting of stainless steel and cast iron, each having a thermal expansion coefficient which is low for metals. The piston material is selected from the group consisting of aluminum, plastic, and magnesium.

Preferably the ceramic is comprised of a material selected from the group consisting of zirconia and aluminia, each having a thermal expansion coefficient (high for ceramics) which matches correctly with the thermal expansion coefficient of the carrier member (low for metals).

It is preferable that the grooved wall, formed in the piston or, more advantageously, in the embedded metallic ring forming part of the piston, have a depth of no less than 0.010 inch and a width of no less than 0.020 inch. The high energy beam is preferably an electron beam, useful in melting a portion of the carrier member without melting of the cast-in-place metallic ring, the electron beam having an energy level of at least 3000 watts, and usually controllable within the range of 3000–6000 watts.

The invention is also a composite piston useful in a reciprocating engine, comprising: (a) a low weight piston member having a top, side, and a grooved wall defined in the side; (b) a ceramic facing member; and (c) a carrier member wrapped about the top of the piston member with a portion depending in alignment with the piston side, said carrier member being effective to support the ceramic facing member for separated but conjoint movement with the piston member, the carrier member having a part of the depending portion fused and locked to the grooved wall.

BEST MODE FOR CARRYING OUT THE INVENTION

Figure 1:
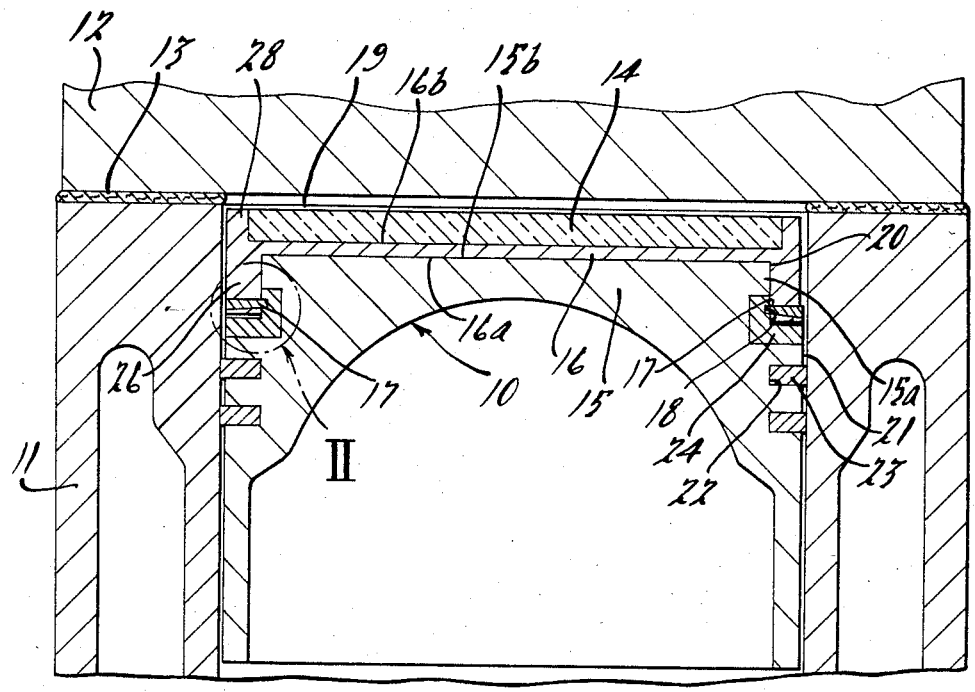
FIG. 1 is a central sectional elevational view of a portion of an engine illustrating the composite piston in operative association with a portion of an engine block and an engine head.
Figure 2:
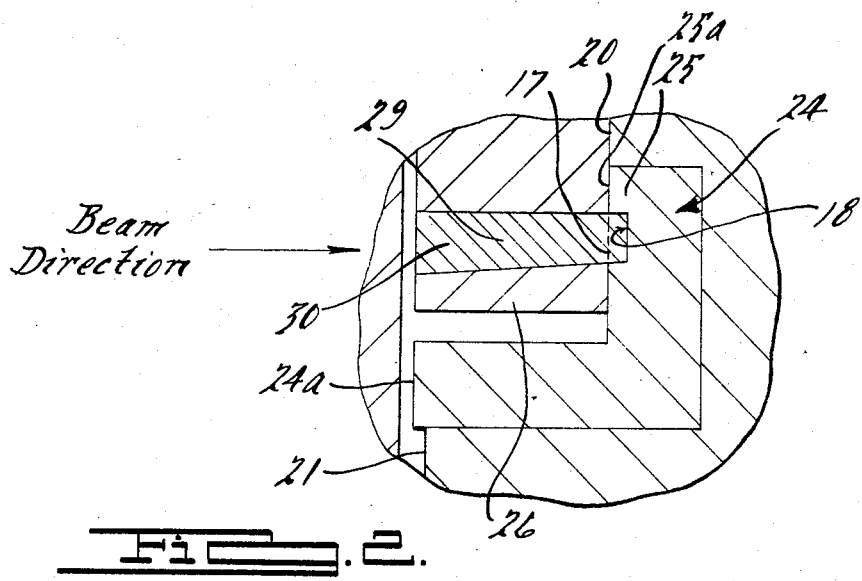
FIG. 2 is an enlarged sectional view of a portion of the structure of FIG. 1.

Turning now to FIG. 1, the composite piston 10 comprises a piston member 15, a ceramic facing member 14, and a carrier member 16. The carrier member separates the facing member from the piston member, but secures it for conjoint movement with the piston member by way of portion 17 which is fused and locked to a groove wall 18 of the piston member (see FIG. 2). The ceramic facing member is exposed upwardly to aid in defining a combustion chamber 19 in cooperation with the engine head 12 and the block 11, gasket 13 being interposed between the head and block to assure sealing of the internal combustion chamber 19. The sides of the composite piston 10 are adapted to reciprocate along the interior walls of an engine block 11, contact therebetween being by metallic seal rings 23 on the piston member bearing against the block.

The method by which the piston assembly is fabricated is as follows.

1. Forming

The members of the composite piston are formed. First the ceramic facing member 14 is formed of a material preferably selected from the group consisting of zirconia and aluminia, each having a high thermal expansion coefficient for ceramics, typically about $5.0-5.6 \times 10^{-6}$ in/in/°F. The forming may be carried out by conventional ceramic powder pressure sintering techniques. The die or mold for the sintering of the ceramic powder is shaped to define a disc having a diameter typically in the range of 1-6 inches and a thickness of about 0.1-0.5 inch. The facing member is preferably sized to extend over a major portion of the top 15b of the piston member.

The piston member 15 is formed typically by casting or by forging, and is comprised of a material selected from the group consisting of aluminum, plastic, and magnesium, each having a density of less than 0.15 lb/in$^3$. The thermal expansion coefficient of aluminum and magnesium range from 10.0 (for alloyed aluminum) to 14.0 (for pure magnesium)$\times 10^{-6}$ in/in/°F. The piston member has a narrowed neck portion 15a with an upper side wall 20 spaced radially inwardly from its outer cylindrical side wall 21. The side wall 21 has grooves 22 defined therein for carrying split metallic piston rings 23. To improve the wear characteristics of the upper shoulder or side wall 20 of an aluminum piston, an insert ring 24 is cast in place at the time the aluminum piston is formed. Such ring can be formed by casting, forging, or stamping, or other conventional techniques. Such ring is preferably comprised of a material having a coefficient of thermal expansion intermediate that of the piston material and the carrier member. Advantageously, such ring is comprised of nickel resist iron, an iron that can be fabricated with a varying thermal expansion coefficient ranging from 2.8 to $10 \times 10^{-6}$ in/in/°F. Accordingly, the nickel resist iron can be designed to have a desirable thermal expansion characteristic so it can be matched to the assembly. Technology to make and design such irons is disclosed in "Engineering Properties and Applications of Ni-Resist Irons", published by International Nickel, 5th Edition; the disclosure of such article is incorporated herein by reference.

The insert ring has a radially inwardly located neck 25 presenting a surface 25a aligned with the outer surface of neck portion 15a of the piston. The ring has a radially extending flange 26, the flange extending outwardly to an extent slightly beyond the side wall 21 of the piston member with surface 24a acting as an upper shoulder of the piston member.

The carrier member 16 is formed by casting or forging of other conventional techniques and is constituted of a material selected from stainless steel and cast iron, each having a low coefficient of thermal expansion (ranging from $6.0-7.0 \times 10^{-6}$ in/in/°F.) for a metal; each differs from the coefficient of thermal expansion of the ceramic by no greater than $2.0 \times 10^{-6}$ in/in/°F. The carrier member has one side 16a adapted to wrap over and depend along at least a portion of the piston member side 20. This is accomplished here by use of a depending annular flange 26 adapted to fit snugly about the upper neck portion 15a of the piston member. The carrier member has an opposite side 16b provided with means 28 to securely receive the facing member for conjoint movement therewith (here an annular flange).

2. Grooving

An annular grooved wall 18 is machined in the neck 25 of the ring 24 (surface 25a being aligned with upper side wall 20 of the piston member). The grooved wall is disposed at a location radially opposite a portion of the carrier member when the latter is in the wrapped condition; that is, grooved wall 18 is radially opposite flange 26 as it depends downwardly about piston member neck 15a. Preferably the grooved wall 18 has a depth of no less than 0.010 inch and a width of no less than 0.020 inch.

3. Assembling and Welding

The carrier member is fitted or wrapped about the neck 15a of the piston member, preferably by use of a shrink fit, so as to have a tight mechanical relationship therewith. The depending flange 26 of the carrier member fits snugly to surround the upper portion or neck 15a of the nickel resist ring 24 and be radially aligned with the grooved wall 18.

A high energy beam is then directed across a zone 29 of the carrier member (flange 26) radially aligned with the grooved wall 18 in a manner to melt portion 30 of the carrier member intersected by the beam and cause the melted portion to flow into the grooved wall 18 to fill the groove. The high energy beam is preferably comprised of an electron beam having an energy level in the range of 3000-6000 watts, and effective to raise the temperature of the intersected carrier member to melting within a matter of about 0.7 minutes without melting of the cast-in-place ring 24. After removal of the beam, the resulting solidified material that had flowed into the grooved wall forms a mechanical lock at 17 between the carrier member and the nickel resist ring (the latter forming a part of the piston member).

I claim:

1. A method of making a composite piston for a reciprocating engine, comprising:
    (a) forming members to constitute said composite piston, including:
        (i) a piston member comprised of a material selected from plastic and metal having a density of less than about 0.15 lb/in$^3$, said piston member having a top, a side, and a cast in place metallic ring in the side of the piston member, said ring presenting an annular grooved wall disposed at a location radially opposite a depending portion of the carrier member when the latter is in the wrapped position, (ii) a ceramic facing member adapted to extend over the top of said piston, (iii) a carrier member effective to separate said facing member from said piston member while securing said facing member and piston member together for conjoint movement, said carrier member having one side adapted to wrap over the top of the piston with a portion depending along at least a portion of the piston side, said carrier member having an opposite side with means to secure said facing member for movement therewith, said carrier member being comprised of a material having a coefficient of thermal expansion differing from the coefficient of thermal expansion of said ceramic by up to $2.0 \times 10^{-6}$ in/in/°F., said metallic ring being comprised of a material having a coefficient of thermal expansion intermediate that of the material for the piston member and for the carrier member;

(b) assembling said members by securing said ceramic facing member to said opposite side of the carrier member and wrapping said one side of the carrier member over said piston top with said portion depending along at least a portion of the piston side; and (c) with the carrier member wrapped about said piston, directing a high energy beam across a zone of said carrier member radially aligned with said grooved wall and effective to melt the portion of the carrier member intersected by said beam, causing said melted material to flow into the groove to fill the same and lock the piston member to the carrier member upon solidification.

2. The method as in claim 1, in which said high energy beam is effective to melt said portion of said carrier member without melting of the cast-in-place metallic ring.

3. The method as in claim 1, in which said beam is an electron beam having an energy level of at least 3000 watts.

4. The method as in claim 1, in which said metallic ring is comprised of nickel resist iron.

5. The method as in claim 1, in which said carrier member material is selected from the group consisting of stainless steel and cast iron.

6. The method as in claim 1, in which said piston material is selected from the group consisting of aluminum, plastic, and magnesium.

7. The method as in claim 1, in which said ceramic is comprised of a material selected from the group consisting of zirconia and aluminia.

8. A method of making a composite piston for a reciprocating engine, comprising:

(a) forming a cylindrical piston body having a neck recessed to a diameter smaller than the diameter of said body, said piston having a cast-in-place annular insert with a radially extending flange acting as an upper shoulder of the piston and with a radially inwardly located neck presenting an axially extending surface having a diameter commensurate with the diameter of said body neck;

(b) forming a ceramic facing member adapted to extend over the top of said piston;

(c) defining a carrier member effective to separate said facing member from said piston while securing said facing member to the piston for conjoint movement, said carrier member having one side adapted to wrap over said body neck with a portion depending along said insert neck, the carrier member being comprised of a material having a coefficient of thermal expansion differing from the coefficient of thermal expansion of said ceramic by up to $2.0 \times 10^{-6}$ in/in/°F.;

(d) defining an annular grooved wall in the neck of said insert disposed radially opposite said depending portion of the carrier member; and (e) directing a high energy beam through said depending portion of the carrier member which is radially aligned with the grooved wall to melt that part of the carrier member intersected by the high energy beam and to cause said melted part to flow into said grooved wall and thereby provide a mechanical lock upon solidification of the melted part.

9. The method as in claim 8, in which said insert is comprised of nickel resist iron.

10. The method as in claim 9, in which said grooved wall has a depth of no less than 0.01 inch and a width of no less than 0.02 inch.

11. A composite piston useful in a reciprocating engine, comprising:

(a) a low weight piston member having a top, a side, and a metallic ring in the side of the piston, said ring having annular grooved wall defined therein, said metallic ring being comprised of a material having a coefficient of thermal expansion intermediate that of the material for the piston and for the carrier member;

(b) a ceramic facing member; and (c) a carrier member wrapped about the top of said piston member with a depending portion in alignment with said piston side, said carrier member being effective to support said ceramic facing member for separated but conjoint movement with said piston member, said carrier member having part of said depending portion fused and locked to said grooved wall.

12. The composite piston as in claim 11, in which said metallic ring is comprised of nickel resist iron.

* * * * *